United States Patent
Redmond et al.

(10) Patent No.: US 9,747,372 B2
(45) Date of Patent: Aug. 29, 2017

(54) SYSTEMS AND METHODS FOR DISCOVERING SOCIAL ACCOUNTS

(71) Applicant: Social IQ Networks, Inc., Burlingame, CA (US)

(72) Inventors: Devin Redmond, Encinitas, CA (US); Ray Kruck, Burlingame, CA (US); Richard Sutton, Poway, CA (US); Anthony Dorie, San Francisco, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 104 days.

(21) Appl. No.: 13/864,815

(22) Filed: Apr. 17, 2013

(65) Prior Publication Data

US 2013/0325850 A1 Dec. 5, 2013

Related U.S. Application Data

(60) Provisional application No. 61/625,351, filed on Apr. 17, 2012.

(51) Int. Cl.
*G06F 17/30* (2006.01)

(52) U.S. Cl.
CPC .............................. *G06F 17/30864* (2013.01)

(58) Field of Classification Search
CPC .................................................. G06F 17/30864
USPC ................................................. 707/722, 770
See application file for complete search history.

(56) References Cited

U.S. PATENT DOCUMENTS

| | | | | |
|---|---|---|---|---|
| 7,249,123 B2 * | 7/2007 | Elder | | G06Q 10/10 |
| 7,886,000 B1 * | 2/2011 | Polis et al. | | 709/203 |
| 2007/0005654 A1 * | 1/2007 | Schachar | | G06Q 10/00 |
| 2007/0255807 A1 * | 11/2007 | Hayashi et al. | | 709/219 |
| 2008/0182563 A1 * | 7/2008 | Wugofski et al. | | 455/414.2 |
| 2009/0177744 A1 * | 7/2009 | Marlow et al. | | 709/204 |
| 2010/0114788 A1 * | 5/2010 | White et al. | | 705/319 |
| 2010/0161369 A1 * | 6/2010 | Farrell et al. | | 705/8 |
| 2010/0241652 A1 * | 9/2010 | Fasihuddin | | G06F 17/30864 |
| | | | | 707/769 |
| 2011/0010641 A1 * | 1/2011 | Wolff et al. | | 715/753 |
| 2011/0078584 A1 * | 3/2011 | Winterstein et al. | | 715/751 |
| 2011/0087534 A1 * | 4/2011 | Strebinger | | G06Q 10/06 |
| | | | | 705/14.25 |
| 2011/0251970 A1 * | 10/2011 | Oien et al. | | 705/319 |
| 2011/0264525 A1 * | 10/2011 | Bhatia | | G06Q 30/02 |
| | | | | 705/14.54 |
| 2011/0307397 A1 * | 12/2011 | Benmbarek | | 705/319 |

(Continued)

OTHER PUBLICATIONS

Benevuto, Fabricio, et al., "Characterizing User Behavior in Online Social Networks", IMC '09, Chicago, IL, Nov. 4-6, 2009, pp. 49-61.*

(Continued)

*Primary Examiner* — Robert Stevens
(74) *Attorney, Agent, or Firm* — Goodwin Procter LLP

(57) ABSTRACT

Methods and systems allow organizations to discover accounts, subscriptions, properties, sites and other online portals within each distinct social network platform and across disparate social network platforms, publishing platforms and networks that represent, claim to represent or are relevant to their organization and/or brands based on search terms and facilitate the statistical reporting and analysis of activities on the discovered properties.

31 Claims, 11 Drawing Sheets

(56) References Cited

U.S. PATENT DOCUMENTS

| | | | | |
|---|---|---|---|---|
| 2012/0059820 | A1* | 3/2012 | Lakshmanan | G06F 17/30867 707/723 |
| 2012/0254149 | A1* | 10/2012 | Ramsay | 707/709 |
| 2012/0317142 | A1* | 12/2012 | Broecheler et al. | 707/770 |
| 2012/0323704 | A1* | 12/2012 | Steelberg | G06Q 30/0268 705/14.73 |
| 2013/0110827 | A1* | 5/2013 | Nabar | G06Q 10/00 707/728 |
| 2013/0124192 | A1* | 5/2013 | Lindmark | G06F 17/274 704/9 |
| 2013/0166543 | A1* | 6/2013 | MacDonald | G06F 17/30867 707/723 |
| 2014/0040285 | A1* | 2/2014 | Rubinstein et al. | 707/751 |
| 2014/0149448 | A1* | 5/2014 | Betz | G06F 17/30702 707/769 |
| 2014/0222811 | A1* | 8/2014 | Chauhan | G06F 17/3089 707/736 |
| 2014/0379681 | A1* | 12/2014 | Puligundla | G06F 17/30867 707/706 |
| 2015/0293997 | A1* | 10/2015 | Smith | H04L 51/32 707/749 |

OTHER PUBLICATIONS

Bonneau, Joseph, et al., "Eight Friends Are Enough: Social Graph Approximation via Public Listings", SNS '09, Nuremburg, Germany, © 2009, pp. 13-18.*

Boulos, Maged N. Kamel, et al., "Social Web mining and exploitation for serious applications: Technosocial Predictive Analytics and related technologies for public health, environmental and national security surveillance", Computer Methods and Programs in Biomedicine, vol. 100, Issue 1, Oct. 2010, pp. 12-23.*

Chelmis, Charalampos, et al., "Social Networking Analysis: A State of the Art and the Effect of Semantics", PASSAT / SocialCom 2011, Boston, MA, Oct. 9-11, 2011, pp. 531-536.*

Chen, Jilin, et al., "Make New Friends, but Keep the Old—Recommending People on Social Networking Sites", CHI 2009, Boston, MA. Apr. 4-9, 2009, pp. 201-210.*

Guy, Ido, et al., "Harvesting with SONAR—The Value of Aggregating Social Network Information", CHI 2008, Florence, Italy, Apr. 5-10, 2008, pp. 1017-1026.*

Huber, Markus, et al., "Towards Automating Social Engineering Using Social Networking Sites", CSE 2009, Vancouver, BC, Aug. 29-31, 2009, pp. 117-124.*

Lerman, Kristina, "Social Networks and Social Information Filtering on Digg", arXiv preprint cs/0612046, © 2006, 8 pages.*

Rana, Juwel, et al., "Enriching and Simplifying Communication by Social Prioritization", ASONAM 2010, Odense, Denmark, Aug. 9-11, 2010, pp. 336-340.*

Wang, Yuan, "SocConnect: A Social Networking Aggregator and recommender", Master Science Thesis, Dept. of Computer Science, Univ. of Saskatchewan, Saskatoon, Nov. 2010, 113 pages.*

Perer, Adam, et al., "Visual Social Network Analytics for Relationship Discovery in the Enterprise", VAST 2011, Providence, RI, Oct. 23-28, 2011, pp. 71-79.*

Rahman, Md. Abdur, et al., "Building Dynamic Social Network from Sensory Data Feed", IEEE Transactions on Instrumentation and Measurement, vol. 59, No. 5, May 2010, pp. 1327-1341.*

Xiang, Rongjing, et al., "Modeling Relationship Strength in Online Social Networks", WWW 2010, Raleigh, NC, Apr. 26-30, 2010, pp. 981-990.*

Random House Webster's College Dictionary, Random House, Inc., New York, NY, © 2000, p. 22.*

* cited by examiner

SYSTEMS AND METHODS FOR DISCOVERING SOCIAL ACCOUNTS

CROSS-REFERENCE TO RELATED APPLICATIONS

This application claims priority to and the benefits of U.S. provisional patent application Ser. No. 61/625,351, filed on Apr. 17, 2012, the entire disclosures of which are incorporated herein by reference.

FIELD OF THE INVENTION

The invention relates generally to social networking and advertising, and, more specifically, to techniques and supporting systems for identifying, categorizing, and classifying media properties within, across, and among distinct social network platforms.

BACKGROUND

Social networking platforms and networks including Facebook, Google+, LinkedIn, Twitter, YouTube, Xing, and many others are well established and have millions of subscribers. In fact, these networks have become so pervasive that they are commonly used by organizations as an advertising platform as well as a conduit for communicating with their customers, clients, alumni, and target audiences. Creating accounts on these disparate networks is relatively simple and allows individual users to easily create properties on behalf of an organization, whether sanctioned by the organization or not. In many cases, these disparate networks do not have any mechanisms to accurately define or verify the actual relationship of one of these accounts to the respective organization it may be representing. Also, these platforms have no central way to aggregate, consolidate or track multiples of these properties, rate their relevance and relationship to an organization. As a result the social networks cannot accurately describe their relationship with other properties or accounts on other platforms and networks relative to a single organization. Furthermore, there is no way logically organize these accounts based on their relevance and relationship to that respective organization.

The rapid growth and lower barrier of entry for creating these accounts and properties, combined with the inability to easily identify, organize and track accounts related to an organization is a growing challenge for organizations. Given that these properties are created to represent the brand of the organization and communicate with their customers, prospective customers, partners, and influencer audiences, the lack of awareness, visibility, and organization of these properties represents missed opportunities and potential risks for the organization.

Therefore, there is a need for systems and techniques to allow organizations to automatically and programmatically discover properties across social network platforms and networks that are related to their respective organization independent of any one platform or network. Moreover, these organizations desire the ability to rate the relevance of the discovered accounts and properties, categorize them based on their affiliation and relevance, and track and measure their use, prevalence and effectiveness based on these characteristics.

SUMMARY OF THE INVENTION

The invention provides various techniques and supporting systems that allow organizations to discover accounts, subscriptions, properties, sites and other online portals (referred to collectively herein as "social properties") within each distinct social network platform and across disparate social network platforms, publishing platforms and networks that represent, claim to represent or are relevant to their organization and/or brand(s) based on a particular search term (or terms).

As a result the invention returns sets of properties relevant to the organization based on user-specified terms and relationships among the terms. The results may then categorized, grouped and reported based on a set of classifications resulting from relevance scores that attribute the properties into categories related to the organization. This categorization can include, as an example, differentiating among company accounts and individual accounts, where the individual(s) have a relationship to the company but who may or may not speak on behalf of the company. The identified properties are determined based, for example, on a scored and matched set of attributes of each property cultivated and correlated from multiple sources. This includes the integration and combination of searches and matches of terms from respective social network platform APIs, custom Internet search engine queries, content classification engines, custom algorithms, and Boolean operators.

Therefore, in one aspect, the invention provides a method, implemented on a computer, for correlating multiple social network properties across multiple disparate social network platforms wherein each property is associated with an entity. The computer includes a memory for storing computer executable instructions and a processing unit for executing the instructions. When executed, the instructions facilitate the submission of search strings to the disparate social network platforms via a plurality of application programming interfaces, wherein each application programming interface is associated with a respective social network platform and the search strings are related to the entity. The instructions further facilitate the receipt, of unique property identification data for social network properties existing on the social network platforms that match the search strings. The received data is normalized such that the unique property identification data may be stored in a database as associated with the single entity and stored in the normalized unique property identification data in physical memory.

In some embodiments, the search strings include multiple terms, and, in certain instances, a weighting or correlation among the terms may be provided. The weighting can represent, for example, a relationship among the terms, and the correlation may be positive or negative. In some instances, the submission of search strings may be devoid of user login credentials, whereas in other cases the search strings may be submitted with user credentials.

At least a subset of the application programming interfaces are provided by the respective social network platforms, and certain other application programming interfaces may be provided by third parties not related to the social network platforms.

The unique property identification data received in response to submission of the queries may include, for example, a property name, user generated content created by users associated with the respective social network property, user generated content created by users unaffiliated with the respective social network property, security settings associated with the respective social network property, and/or view statistics associated with the respective social network property. In certain instances, the unique property information data comprises indications of the entities' interactions with the properties associated with the respective entities' social network properties and updating the one or more search strings based thereon. In cases in which the search strings include at least two search strings, the received may be categorized based on a relationship of those properties to the organization. A graphical user interface may also be provided for presenting the unique property information data and facilitating user interaction therewith.

In another aspect, the invention provides a system for correlating multiple social network properties across multiple disparate social network platforms, wherein each property is associated with a single entity. The system includes a memory for storing computer executable instructions and a processing unit for executing the instructions stored in the memory. Execution of the instructions results in the instantiation of a query module and a data normalization module. The query module, when executed, facilitates the submission of search strings to the multiple disparate social network platforms via application programming interfaces, wherein each application programming interface is associated with at least one of the respective social network platforms and each of the search strings is related to the single entity. The query module also receives unique property identification data for social network properties existing on the social network platforms that match the search strings. The data normalization module, when executed, normalizes the unique property identification data such that the unique property identification data may be stored in a database as associated with the single entity and stores the normalized unique property identification data in physical memory.

In some embodiments, the search strings include multiple terms, and, in certain instances, a weighting or correlation among the terms may be provided. The weighting can represent, for example, a relationship among the terms, and the correlation may be positive or negative. In some instances, the submission of search strings may be devoid of user login credentials, whereas in other cases the search strings may be submitted with user credentials.

At least a subset of the application programming interfaces are provided by the respective social network platforms, and certain other application programming interfaces may be provided by third parties not related to the social network platforms.

The unique property identification data received in response to submission of the queries may include, for example, a property name, user generated content created by users associated with the respective social network property, user generated content created by users unaffiliated with the respective social network property, security settings associated with the respective social network property, and/or view statistics associated with the respective social network property. In certain instances, the unique property information data comprises indications of the entities' interactions with the properties associated with the respective entities' social network properties and updating the one or more search strings based thereon. In cases in which the search strings include at least two search strings, the received may be categorized based on a relationship of those properties to the organization. A graphical user interface may also be provided for presenting the unique property information data and facilitating user interaction therewith.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention

DETAILED DESCRIPTION

Figure 1:
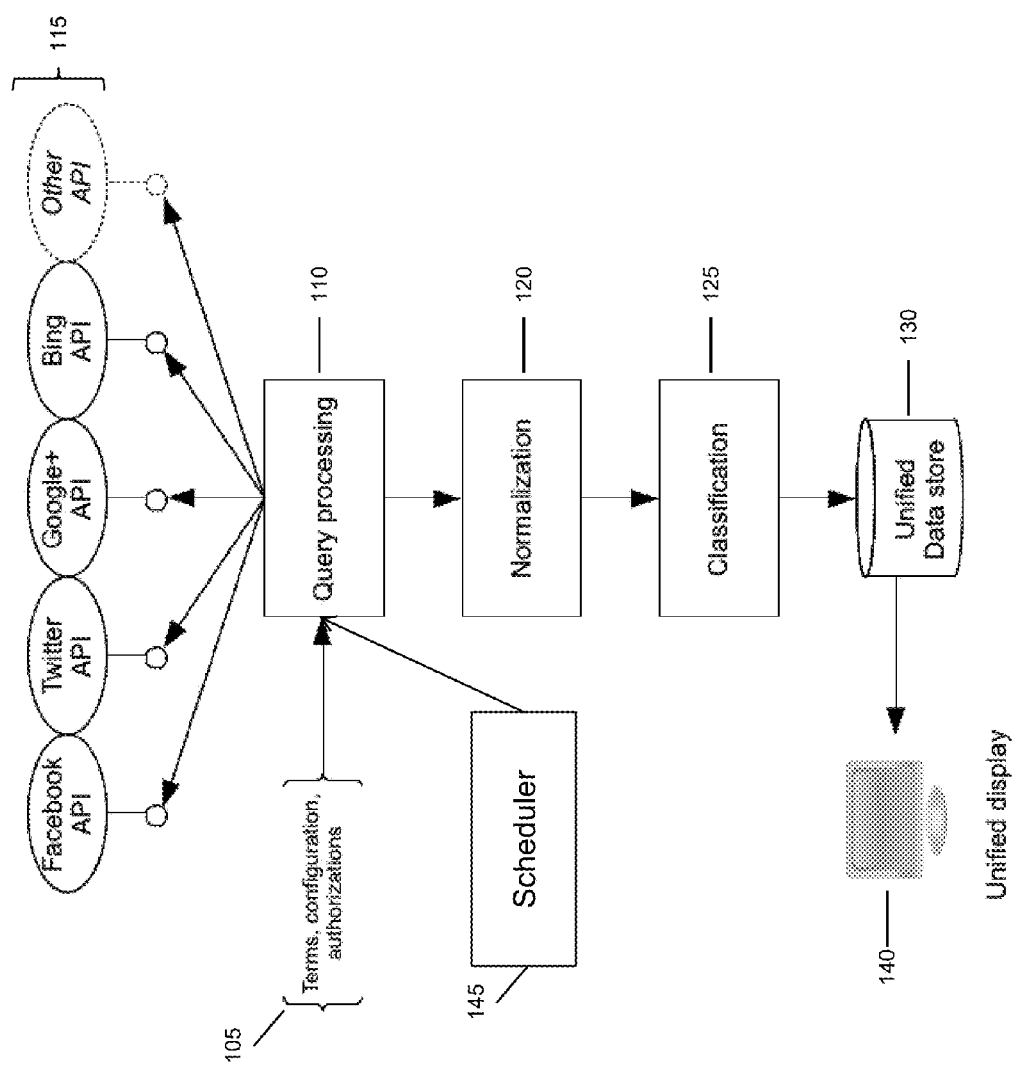
FIG. 1 is a block diagram of a system for discovering and categorizing social network properties across multiple social network platforms according to an embodiment of the invention.

FIG. 1 illustrates, generally, a process for discovering social network properties related to an organization. Generally, social network properties refers to accounts, profiles, pages, or other terms used to describe user-specific or organization-specific properties and accounts set up within an established social network platform such as Facebook, Twitter, Google+, Bing, Instagram and LinkedIn as well as websites and pages set up using site hosting services such as GoDaddy, Web.com, etc. The term may also apply to "custom" properties that are designed and hosted by the organization itself, such as its corporate and/or consumer website.

Initially, a member or representative of the organization provides a set of search strings, configuration parameters, and in some cases user credentials and authorizations 105 that are used as input into the process. The search strings may, in some cases, be a single word or term (e.g., NIKE or ROLLERBLADE). In other instances, the search strings may include more than one term and may include a probabilistic weighting that indicates the strength of the relationship between the two terms. For example, Delta Airlines may use the terms Delta and Airlines with a 95% weighting, to avoid receiving results related to the Delta faucet company and the Delta Dental insurance company. Nike may use the terms NIKE and RUNNING but attribute a lower weighting. Although described herein as a percentage, the weighting may be described using any quantitative terms (e.g., 1-10) or even qualitative terms (e.g., weak, neutral, strong) that are then converted into quantitative terms for processing. In some instances, there may be a collection of terms used such as a group of brands that, other than being owned and/or distributed by the same entity, have little or no relationship. For example, Proctor and Gamble may use [(CREST and TOOTHPASTE) and (GILETTE and RAZOR)] as a single search string, knowing that the results will include properties that will eventually be viewed and analyzed separately.

In some cases, access to the properties and/or the data and content associated with the properties may be restricted and require account-specific user credentials. In such cases, users may include the credentials with each search string. In some cases, multiple sets of credentials may be provided if, for example, the user is aware of multiple properties that require different credentials.

Once identified, the search strings are submitted to a query processing module 110. The query processing module 110 accepts the search strings and formats the strings and terms as required by individual platform application programming interfaces (APIs) 115. The APIs are typically provided by the platforms themselves, but in some cases custom APIs may be developed to access data held by the platforms. For example, an API may require search strings to be presented in a particular format, coupled with the any user credentials associated with one or more properties. In other cases, the APIs may require an indication as to whether the search is to be performed on publicly available data only, or that it is to include data limited to owners of the properties that present the correct credentials.

Regardless of the form or source of the APIs, because they are typically designed and developed independently of each other, the results received from the APIs at the query module are likely in different formats and, in their raw form, are not easily viewed and reported. As such, the results may be provided to a normalization module 120 that identifies metadata that is common to each record and formats the data accordingly. For example, the fields containing the property name may be different among the various platforms (e.g., USERID, MEMBER_ID, ACCT_ID, etc.). The normalization module 120 uses known and, in some cases, discovered relationships among the received records to allow for consistent data storage, aggregation and reporting. In some cases, additional data may be added to the received data that provides additional categorization or classification functionality 125, as described in greater detail below.

Once the received data is normalized and in final form, it is stored in a physical data store 130 for subsequent reporting and analysis. The data store 130 may be user-specific and implemented as a unique instantiation of a commercially-available database management system such as Oracle, MySQL, or others, or on a cloud-based data storage service such as provided by Amazon's RDS. Once stored thereon, the data may be presented and reported using a display device 140, such as a computer terminal, mobile device, tablet, or other commercially-available displays. Examples of the specific interfaces and reports are described in greater detail below.

In some embodiments, a scheduler module 145 is provided that automatically executes pre-defined and stored query strings on a periodic (e.g., weekly, monthly, etc.) basis.

Figure 2:
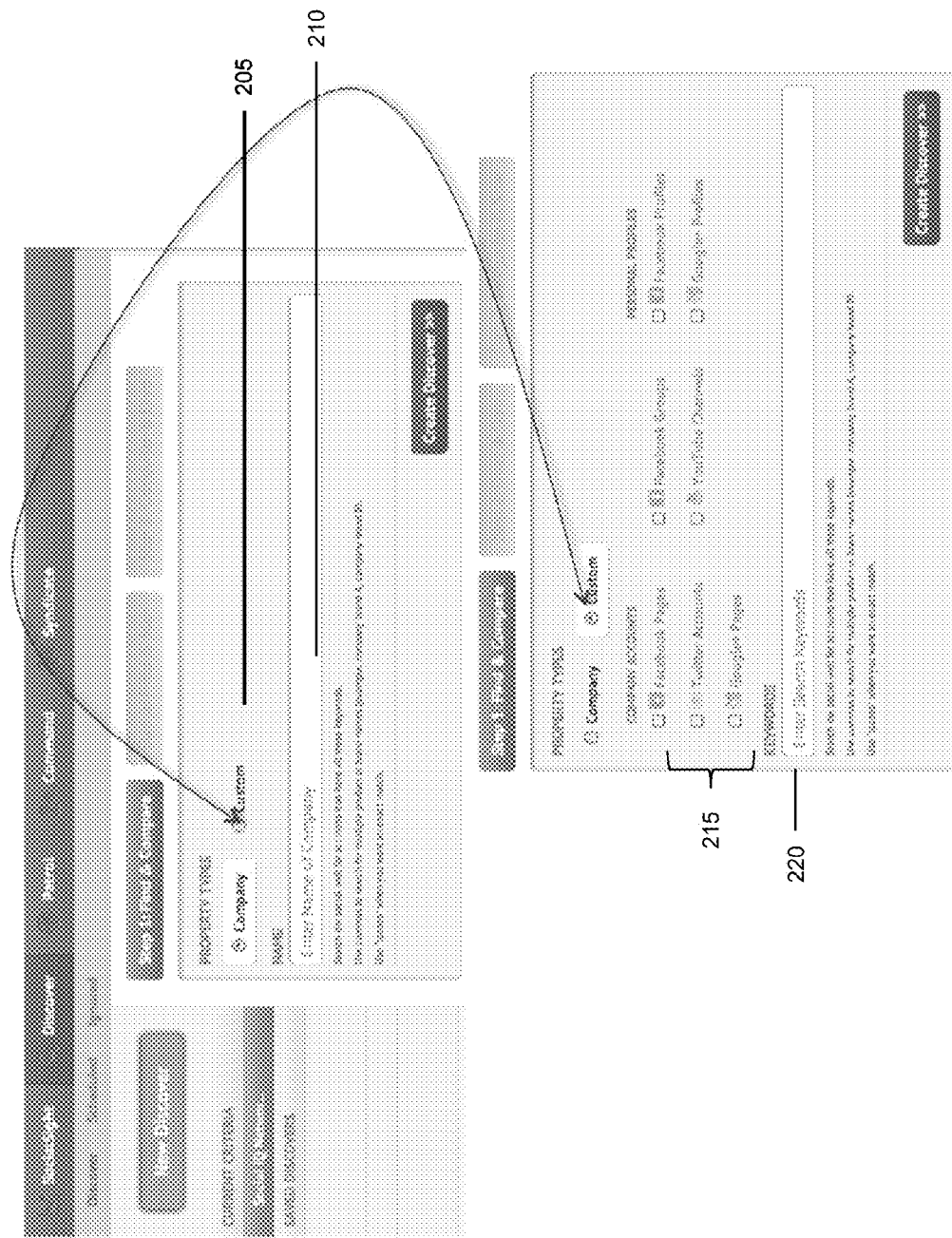
FIG. 2 is an exemplary user interface for entering search query terms according to an embodiment of the invention.

FIG. 2 illustrates an exemplary user interface for using the systems and methods described herein. A user may select between either a "Company" based search or a "Custom" search using, in this example, a set of radio buttons 205. If "Company" is selected, the user may enter the name of the company in a dialog box 210, and a conventional web-based search is executed using the company name. If, however, the user selects "Custom" the user is presented with a listing 215 of various social network platforms to search. In addition, the user is provided a text box 220 in which she may provide the custom search string that is to be submitted to the selected platforms using their respective APIs. In some instances, searches may be saved and reused such that complex search strings need not be reentered, and may be edited to reflect new search terms and results of prior searches.

Figure 3:
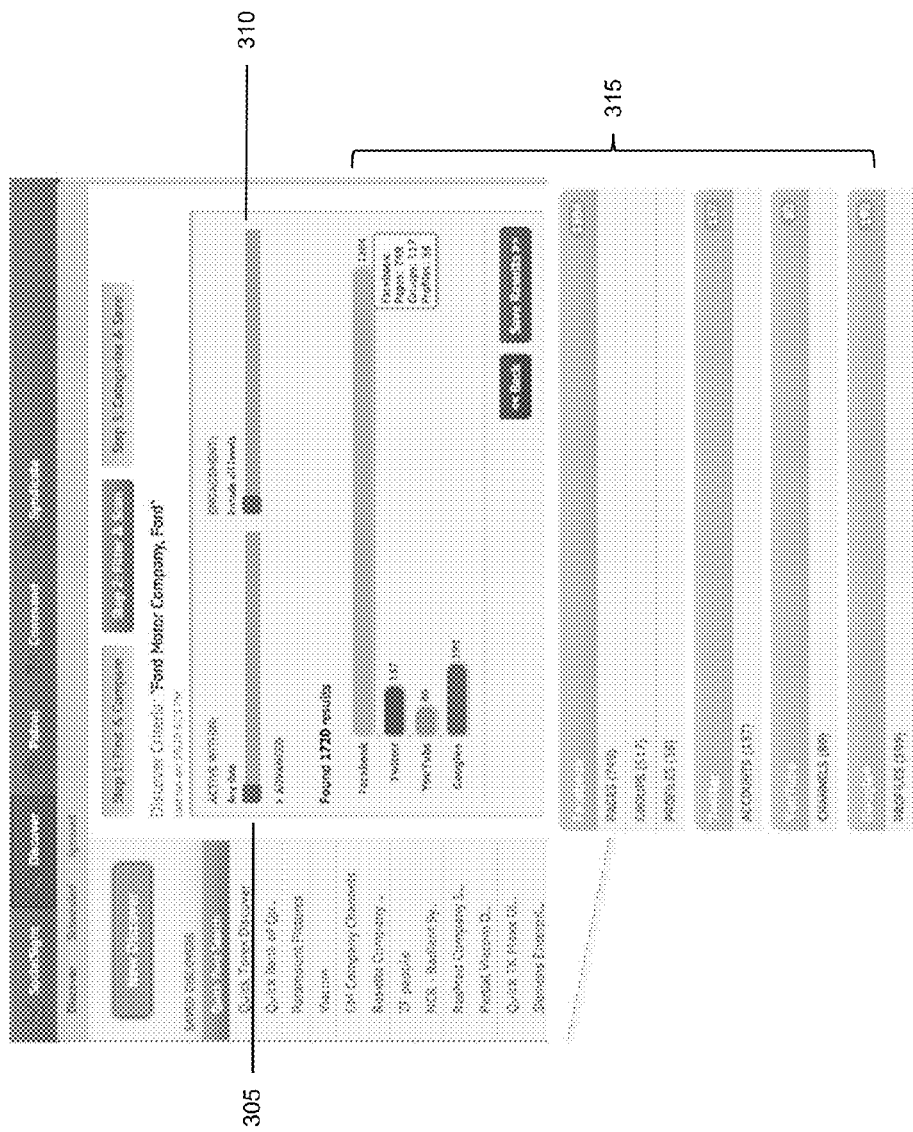
FIG. 3 is an exemplary user interface for viewing a summary of search query results according to an embodiment of the invention.

The received results may be delivered as a raw result, exported to a list, and/or displayed to the user. However, additional filtering and categorization features allow users to dig deeper into the results and identify trends and key properties and use the results to better allocate resources, capital and marketing efforts. FIG. 3 illustrates an exemplary user interface that allows users to filter and scan the results. For example, the results can be further refined by applying filters that limit the properties based on activity dates 305, activity levels 310, and in some cases inclusion and exclusion terms, and content on the properties themselves for topical relevance to the organization. This allows users to eliminate so-called "dead" properties that have had no activity or views within some time period, and/or filter out properties with little or no "engagement"—meaning pages or accounts with minimal views or impressions over some period of time. Once these filters are applied, the results are redisplayed as a general listing 315 that includes the number of properties within each of the selected platforms. In some embodiments, the line item indicating the number of properties returned for each platform may be implemented as an expandable list such that when a user selects the platform, a listing of the individual properties is displayed. The display may be ordered by recency (e.g., date of creation, date of last update, date of last post, etc.), relevancy (degree of match to the search string), or engagement (e.g., number of posts, likes, links, etc.).

Figure 4:
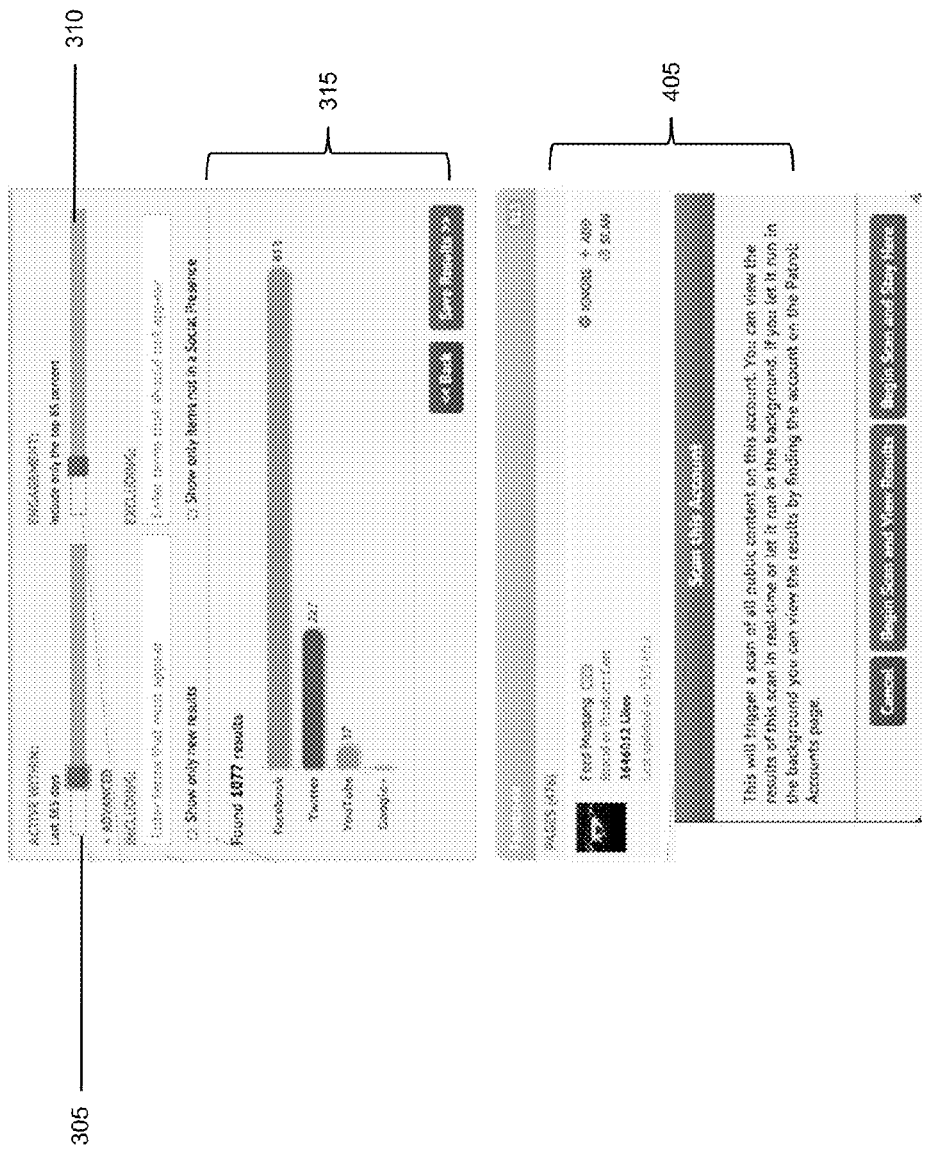
FIG. 4 is an exemplary user interface for filtering search query results according to an embodiment of the invention.

Referring now to FIG. 4, the user may select a subset of the received properties (either by date range, keyword from the search string, term, platform, or any combination thereof) and drill down into the properties. For example, for a search string of [FORD and MUSTANG] there may be hundreds of Facebook accounts, ranging from official Ford-sponsored and managed pages to pages run by car enthusiasts, mechanics, etc. For any given subset, the system allows for a secondary query 405 that scans and returns all the publicly available content associated with the property. For example, if a property is a Twitter account, all the Tweets associated with that account may be returned. In some examples the results may be further filtered based on dates, new content since the last query, and other characteristics.

Once the results have been returned from the query module, filtered and, in some cases, annotated with classification metadata, the results can be named and saved as a distinct discovery search. The named discoveries can be revisited to further refine or organize its results. Additionally, discovery searches may be set to run automatically with a certain periodicity (e.g., every week) and create notifications (email, for example) if new properties have been discovered or of new properties meet certain stored criteria.

Figure 5:
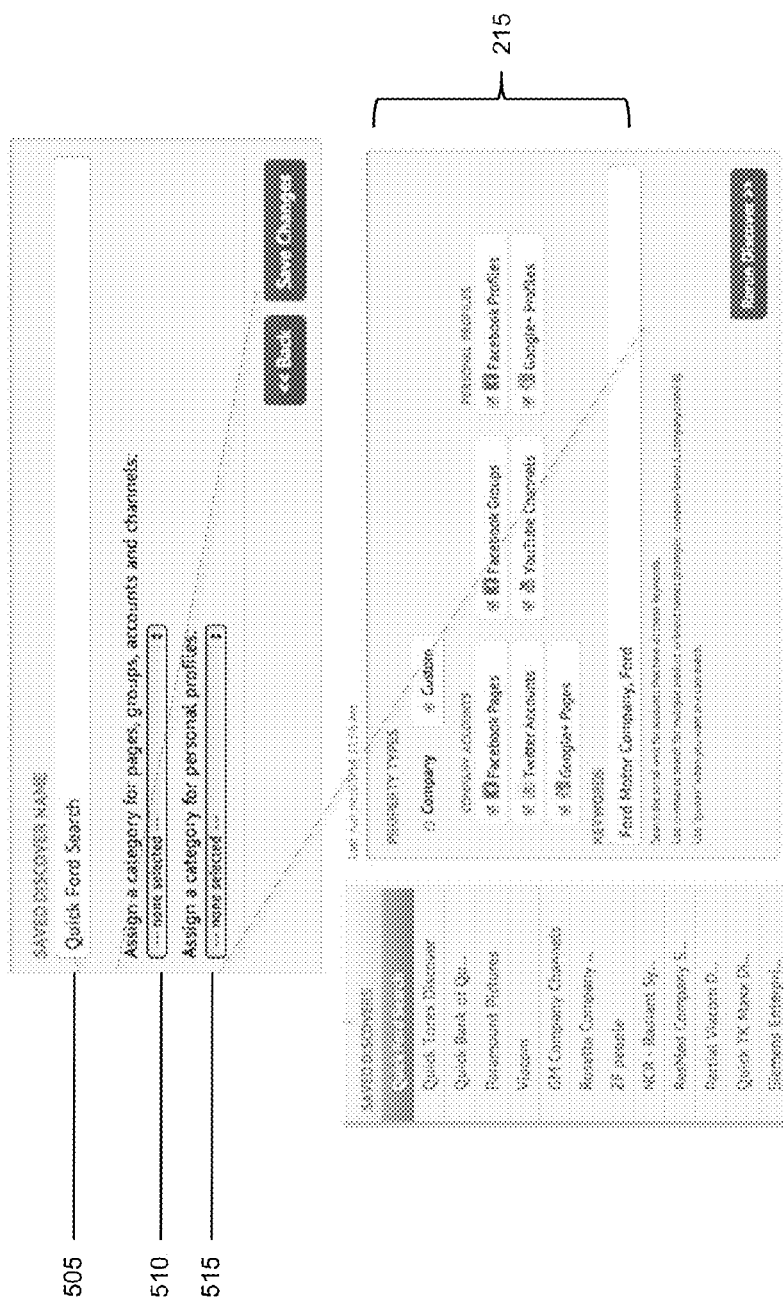
FIG. 5 is an exemplary user interface for saving search query results into a database according to an embodiment of the invention.

Referring to FIG. 5, the received properties may be further organized into specific categories of brand relevance and affiliation. These discrete categories of properties can then be tracked individually or groups of categories can be tracked in aggregate. The categories can be defined and applied automatically, defined automatically and applied by the user, or created and applied as custom categories by the user. In instances in which the classification module automatically organizes and classifies the properties, the key attributes and metadata associated with the properties are used to categorize the properties. In addition, the search string 505 used to generate the list of properties may be used to categorize the properties. In some instances, the categorization may relate to the structure of the social networks (e.g., pages, accounts, profiles, groups, etc.) 510.

Alternatively, the user may create custom, named categories 510 and assign the property or properties to the custom category or categories. Once the category or categories are assigned the properties may be tracked and viewed as a category or groups of categories. These views facilitate analysis of various key attributes of the properties and categories as a onetime snapshot and over a period of time. The stored views include views for social network platform distribution of properties by category, comparison of size and distribution of categories in terms of number of properties, risk and relevance of categories based on the content of properties in the category, and activity or engagement of properties in a category or categories. All of these views are unique derivatives of the discovery and categorization of properties and can be viewed and saved for subsequent reporting and display.

Figure 6:
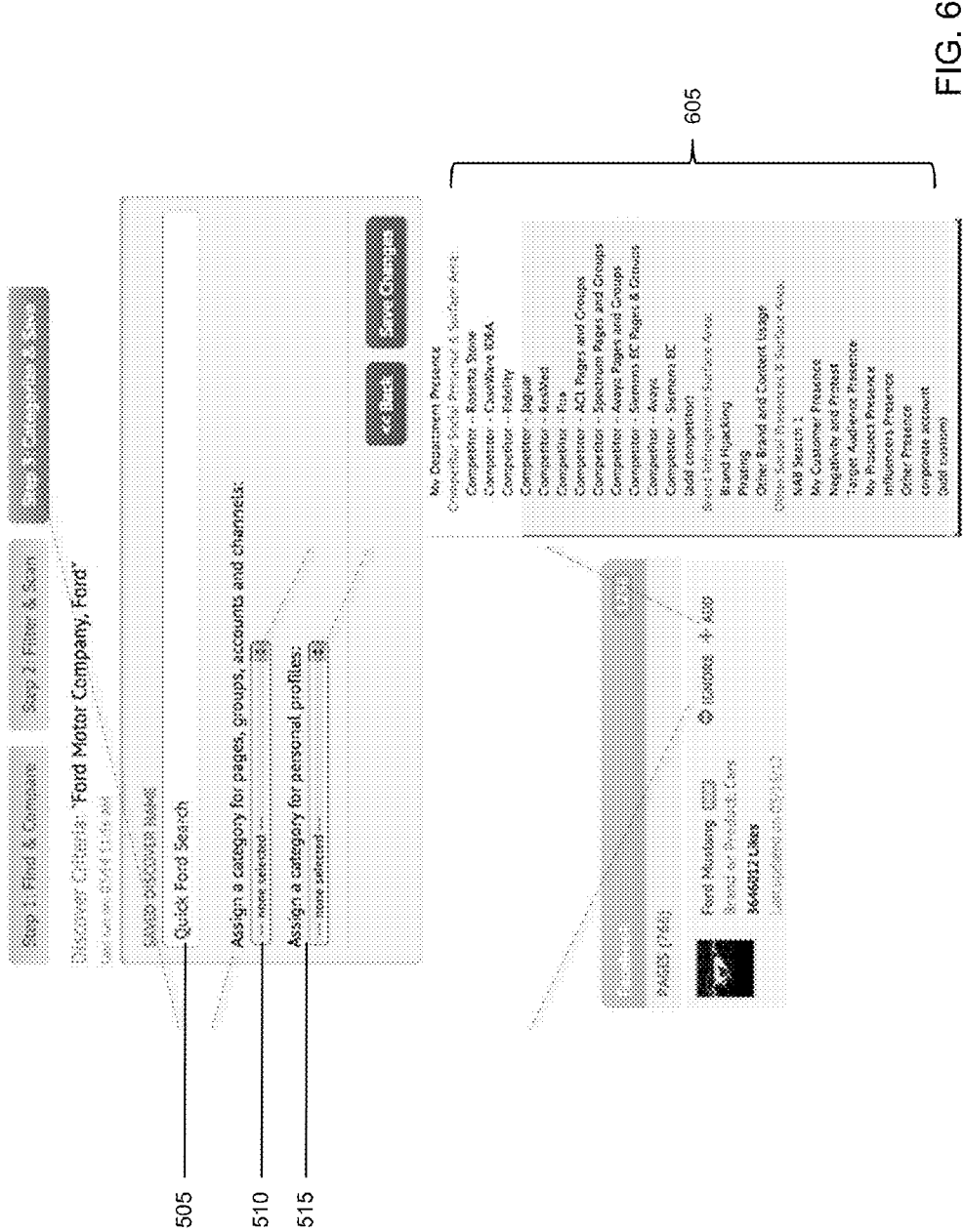
FIG. 6 is an exemplary user interface for categorizing search query results according to an embodiment of the invention.

Referring to FIG. 6, stored search results may be combined with other search results or groupings of results based on categories, sources (specific platforms), and/or classifications. For example, a search for properties related to [FORD and MUSTANG] may be annotated with search results from a stored list 605 of other searches. Moreover, properties returned in certain stored results sets may also be filtered (i.e., excluded from) the results of the current search.

Figure 7:
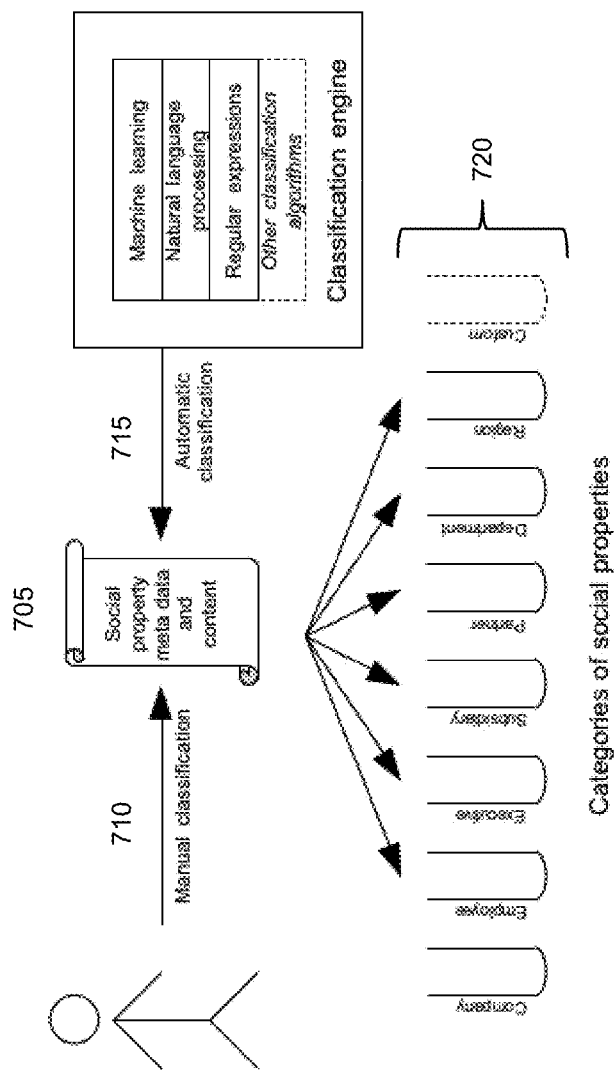
FIG. 7 is a flow chart depicting steps performed in categorizing search query results according to an embodiment of the invention.

FIG. 7 illustrates a general data flow of the classification process. Generally, the content and metadata associated with the discovered properties 705 are received and stored in the system for reporting, filtering, aggregation and analysis. Users can manually classify the results 710 using any term(s) or categories based on custom reporting needs. For example, using the [FORD and MUSTANG] example from above, a user may be interested in images posted on Facebook of Mustangs that date from the late 1960's for an upcoming car rally, to gauge current pricing trends, or to understand the demand for replacement parts. Such a filter or classification may only be needed on an infrequent basis and be so specialized that the automatic categorization may not support such a query. Furthermore, the classification engine may apply automated techniques 715 using, for example, machine learning, natural language processing, text analysis, as well as others to classify the results. For example, the algorithms and Boolean operators use frequency of term appearance in the property's metadata, location of the term in metadata or displayed fields, combinations of the term with other key indicators like the social network platform's classification for the property (if available), the appearance of the property and terms in general internet searches, and the combination of other categories of content in/on the property. The automated and manual classification methods may also be used in concert with each other to produce a categorization of properties 720 based on user-defined terms and structural metadata associated with the properties.

Figure 8:
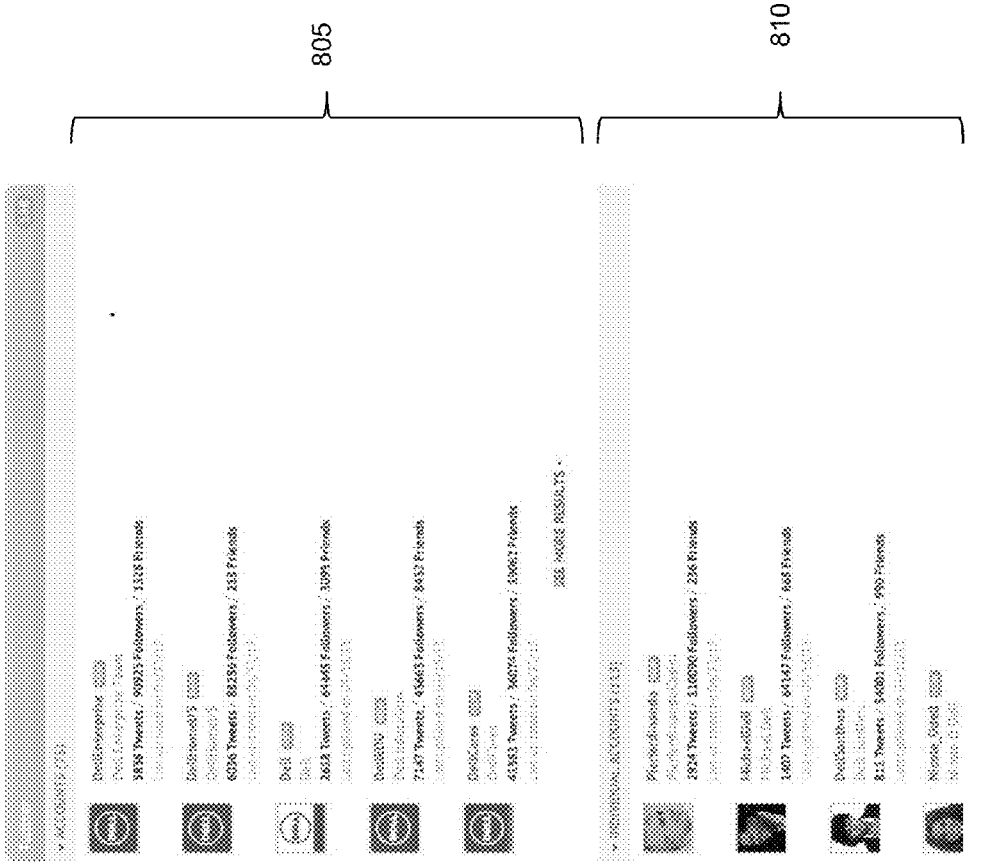
FIG. 8 is an exemplary user interface illustrating the categorization of social network properties based on an affiliation with an entity and individuals associated with the entity.

FIG. 8 illustrates one example of the categorization of properties (Twitter feeds) related to an entity (DELL). In this instance, the system discovered numerous feeds. A subset of these feeds is deemed to be "official" Dell feeds that are sanctioned operated by Dell 805. Other feeds 810 may be loosely associated with Dell based on the individual responsible for the feed (an employee, financial analyst, third party service organization, reseller, etc.) but not "official" Dell feeds. This differentiation allows marketing and sales staffs within the entity to determine the actual reach of their official properties and monitor third-party sites for interesting, incorrect, offensive, or otherwise improper content, as well as promoting those properties that provide valuable information or services.

Figure 9:
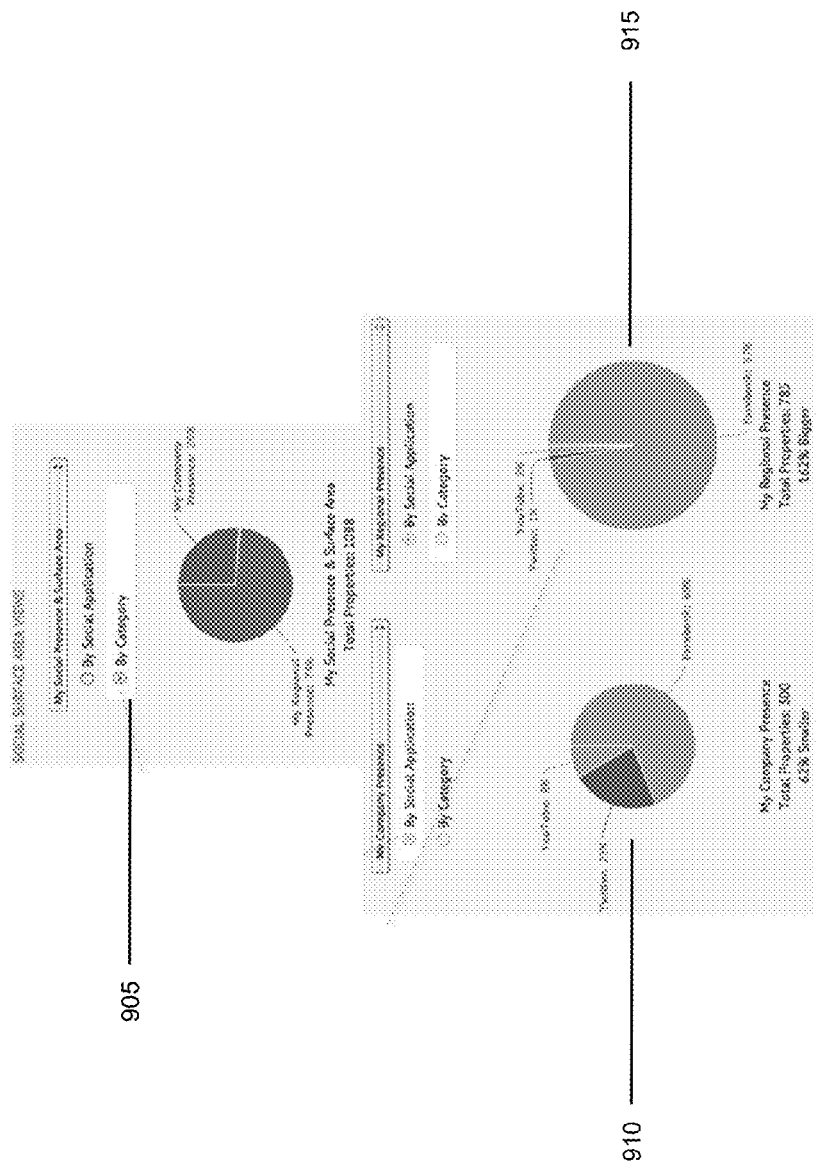
FIG. 9 is an exemplary user interface for graphically depicting statistical characteristics of search query results according to an embodiment of the invention.
Figure 10:
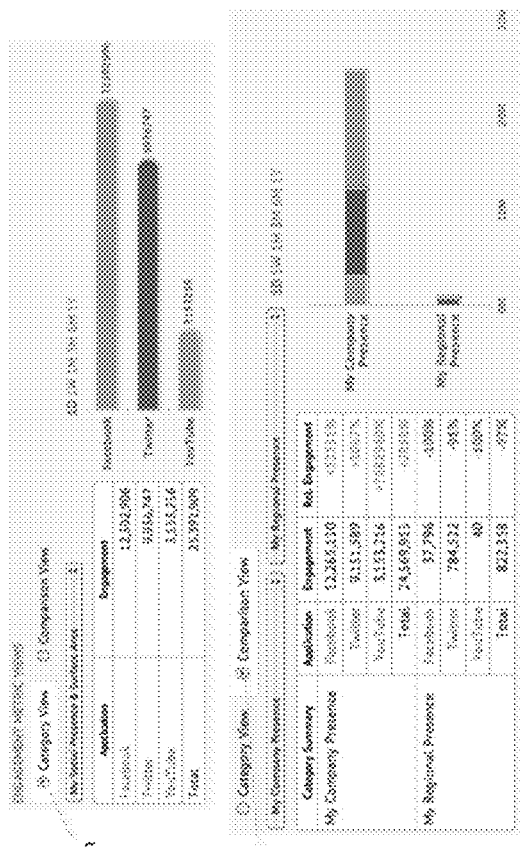
FIG. 10 is an exemplary user interface for depicting statistical characteristics of search query results according to an embodiment of the invention.
Figure 11:
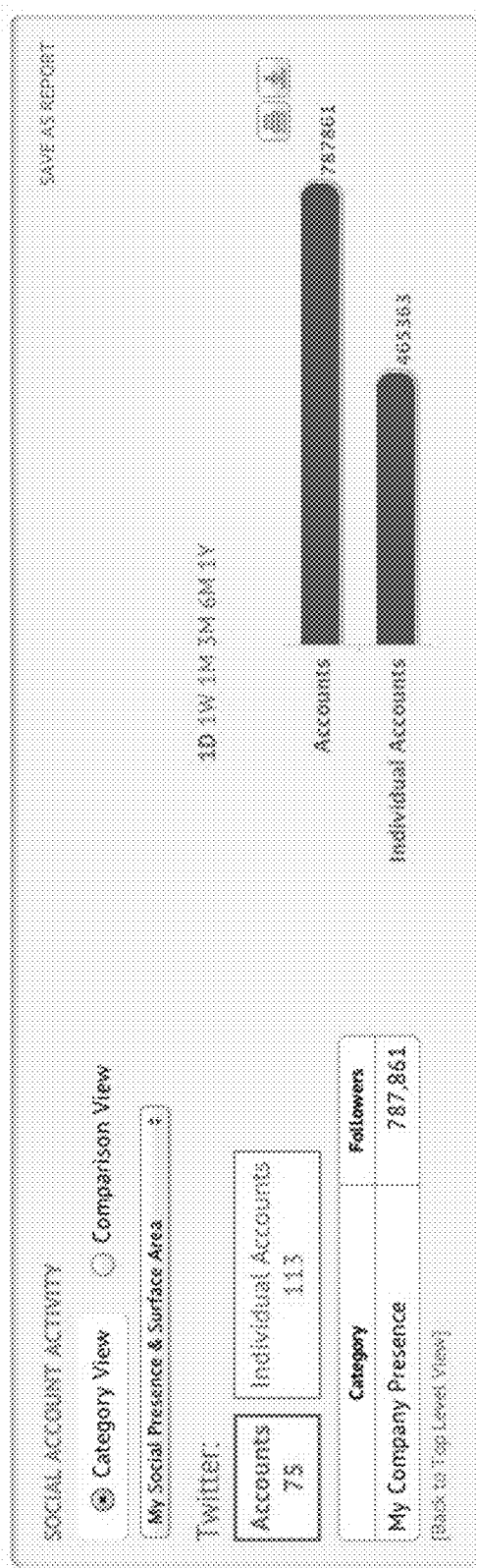
FIG. 11 is an exemplary user interface for depicting the categorization of social network properties within a single platform.

Once the resulting list of properties has been classified and categorized in terms of each property's relationship to the entity executing the searches, the attributes of each category of properties related to the entity as well a comparison of individual or groups of categories to each other may be displayed. Referring to FIGS. 9-11, this includes creating a normalized view of activity across a property or group of properties on a social networking platform or across a group of disparate social networking platforms such that statistical aggregations and analysis can be run against the received results. For example, and referring to FIG. 8, properties may be viewed graphically within an individual social network platform and across disparate social network platforms and by categories to understand the reach of the entities properties 905, the distribution across networks 910, and as a composite of reach by network 915. FIG. 10 illustrates similar data viewed in tabular fashion.

FIG. 11 illustrates the categorization of properties received from a single platform (Twitter), illustrating the number of properties that are deemed to be "company" accounts (feeds) and those that are deemed to be individual accounts (feeds).

The systems and methods described herein may be implemented on and practiced using any communications network capable of transmitting Internet protocols. A communications network generally connects a client with a server, and in the case of peer to peer communications, connects two peers. The communication may take place via any media such as standard telephone lines, LAN or WAN links (e.g., T1, T3, 56 kb, X.25), broadband connections (ISDN, Frame Relay, ATM), wireless links (802.11, Bluetooth, 3G, CDMA, etc.), and so on. The communications network may take any form, including but not limited to LAN, WAN, wireless (WiFi, WiMAX), near-field (RFID, Bluetooth). The communications network may use any underlying protocols that can transmit Internet protocols, including but not limited to Ethernet, ATM, VPNs (PPPoE, L2TP, etc.), and encryption (SSL, IPSec, etc.)

The methods may be practiced with any computer system configuration, including hand-held wireless devices such as mobile phones or personal digital assistants (PDAs), multi-processor systems, microprocessor-based or programmable consumer electronics, minicomputers, mainframe computers, computers running under virtualization, etc.

The methods and systems may also be implemented and practiced in distributed computing environments where tasks are performed by remote processing devices that are linked through a communications network. In a distributed computing environment, program modules may be located in both local and remote computer storage media including memory storage devices.

The data store may be embodied using any computer data store, including but not limited to, relational databases, non-relational databases (NoSQL, etc.), flat files, in memory databases, and/or key value stores. Examples of such data stores include the MySQL Database Server or ORACLE Database Server offered by ORACLE Corp. of Redwood Shores, Calif., the PostgreSQL Database Server by the PostgreSQL Global Development Group of Berkeley, Calif., the DB2 Database Server offered by IBM, Mongo DB, Cassandra, or Redis.

The system may be implemented on any computer system, which may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between components, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Mac OS operating system, Google Android operating system, Apple iOS operating system, or another operating system or platform.

At a minimum, the memory includes at least one set of instructions that is either permanently or temporarily stored. The processor executes the instructions that are stored in order to process data. The set of instructions may include various instructions that perform a particular task or tasks. Such a set of instructions for performing a particular task may be characterized as a program, software program, software, engine, module, component, mechanism, or tool.

The system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Basic, C, C++, CSS, HTML, Java, SQL, Perl, Python, Ruby and/or JavaScript, for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, Storage Area Networking devices, solid state drives, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the systems that embody the invention through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

The systems that embody the invention may communicate with the user via notifications sent over any protocol that can be transmitted over a packet-switched network or telecommunications network. By way of example, and not limitation, these may include SMS messages, email (SMTP) messages, instant messages (GChat, AIM, Jabber, etc.), social platform messages (Facebook posts and messages, Twitter direct messages, tweets, retweets, etc.), and mobile push notifications (iOS, Android, Windows, Blackberry).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Although internal components of the computer are not shown, those of ordinary skill in the art will appreciate that such components and the interconnections are well known. Accordingly, additional details concerning the internal construction of the computer need not be disclosed in connection with the present invention.

What is claimed is:

1. A method, implemented on at least one computer, for correlating multiple social network properties within each distinct social network platform and across multiple disparate social network platforms, each property related to a single entity, the computer comprising at least one memory storing computer executable instructions and at least one processing unit for executing the instructions stored in the memory, wherein execution of the instructions results in the computer performing the steps of:
submitting one or more search strings to the multiple disparate social network platforms via a plurality of application programming interfaces, wherein each application programming interface is associated with at least one of the respective social network platforms and the one or more search strings are related to the single entity;
receiving, from at least a subset of the social network platforms, in a myriad of differing data formats associated with each respective social network platform, metadata associated with social network properties that match the one or more search strings;
normalizing the metadata such that the metadata may be stored, in a common format, in a database associated with the single entity;
categorizing, using, at least in part, the metadata, the social network properties, wherein metadata at least one of generated on behalf of the single entity and generated by a representative of the single entity can be distinguished from metadata related to, but neither generated on behalf of nor generated by a representative of the single entity;
monitoring for at least one of interesting, incorrect, offensive, and improper content regarding the single entity to identify at least one social network platform corresponding to said content; and
storing one or more of the normalized metadata and categorized social network properties in physical memory.

2. The method of claim 1 wherein at least one of the one or more search strings comprise a plurality of terms.

3. The method of claim 2 further comprising providing a probabilistic weighting among the plurality of terms.

4. The method of claim 2 further comprising providing a weighting representing a relationship among the plurality of terms.

5. The method of claim 4 wherein the weighting comprises a positive correlation among the terms.

6. The method of claim 4 wherein the weighting comprises a negative correlation among the terms.

7. The method of claim 1 wherein at least a subset of the application programming interfaces are provided by the respective social network platforms.

8. The method of claim 1 wherein the metadata comprises a property name.

9. The method of claim 1 wherein the metadata comprises user generated content created by users associated with the respective social network property.

10. The method of claim 1 wherein the metadata comprises security settings associated with the respective social network property.

11. The method of claim 1 wherein the metadata comprises view statistics associated with the respective social network property.

12. The method of claim 1 wherein the metadata comprises indications of each entity's interactions with the properties associated with the respective entity's social network properties and updating the one or more search strings based thereon.

13. The method of claim 1 wherein the one or more search strings comprise two search strings and the results received in response to each search string are categorized based on a relationship of those properties to the single entity.

14. The method of claim 1 further comprising providing a graphical user interface for presenting the metadata.

15. The method of claim 1 further comprising running at least one of statistical aggregations and statistical analyses on the categorized social network properties to identify trends.

16. The method of claim 1, wherein the monitoring step monitors for the at least one of interesting, incorrect, offensive, and improper content corresponding to undesirable metadata related to, but neither generated on behalf of nor generated by a representative of the single entity.

17. A system for correlating multiple social network properties within each distinct social network platform and across multiple disparate social network platforms, each property being associated with a single entity, the system comprising at least one memory storing computer executable instructions and at least one processing unit for executing the instructions stored in the memory, wherein execution of the instructions results in one or more application modules together comprising:
a query module for:
submitting one or more search strings to the multiple disparate social network platforms via a plurality of application programming interfaces, wherein each application programming interface is associated with at least one of the respective social network platforms and each of the one or more search strings is related to the single entity; and
receiving, from at least a subset of the social network platforms, in a myriad of differing data formats associated with each respective social network platform, metadata associated with social network properties that match the one or more search strings;
a categorization module for:
categorizing, using, at least in part, the metadata, the social network properties, wherein metadata at least one of generated on behalf of the single entity and generated by a representative of the single entity can be distinguished from metadata related to, but neither generated on behalf of nor generated by a representative of the single entity; and
a data normalization module for:
normalizing the metadata such that the metadata may be stored, in a common data format, in a database associated with the single entity;
monitoring for at least one of interesting, incorrect, offensive, and improper content regarding the single entity to identify at least one social network platform corresponding to said content and
storing one or more of the normalized metadata and categorized social network properties in physical memory.

18. The system of claim 17 wherein at least one of the one or more search strings comprise a plurality terms.

19. The system of claim 18 further comprising providing a probabilistic weighting among the plurality of terms.

20. The system of claim 18 further comprising providing a weighting representing a relationship among the plurality of terms.

21. The system of claim 20 wherein the weighting comprises a positive correlation among the terms.

22. The system of claim 20 wherein the weighting comprises a negative correlation among the terms.

23. The system of claim 17 wherein at least a subset of the application programming interfaces are provided by the respective social network platforms.

24. The system of claim 17 wherein the metadata comprises a property name.

25. The system of claim 17 wherein the metadata comprises user generated content created by users associated with the respective social network property.

26. The system of claim 17 wherein the metadata comprises security settings associated with the respective social network property.

27. The system of claim 17 wherein the metadata comprises view statistics associated with the respective social network property.

28. The system of claim 17 wherein the metadata comprises indications of each entity's interactions with the properties associated with the respective entity's social network properties and updating the one or more search strings based thereon.

29. The system of claim 17 wherein the one or more search strings comprise two search strings and the results received in response to each search string are categorized based on a relationship of those properties to the single entity.

30. The system of claim 17 wherein execution of the instructions further results in the display of a graphical user interface for presenting the metadata.

31. The system of claim 17, wherein the monitoring step monitors for the at least one of interesting, incorrect, offensive, and improper content corresponding to undesirable metadata related to, but neither generated on behalf of nor generated by a representative of the single entity.

* * * * *